Dec. 2, 1952          J. A. DRAKE          2,619,795
AIRCRAFT BOOSTER JET POWER UNIT
Filed Jan. 20, 1947          3 Sheets-Sheet 1
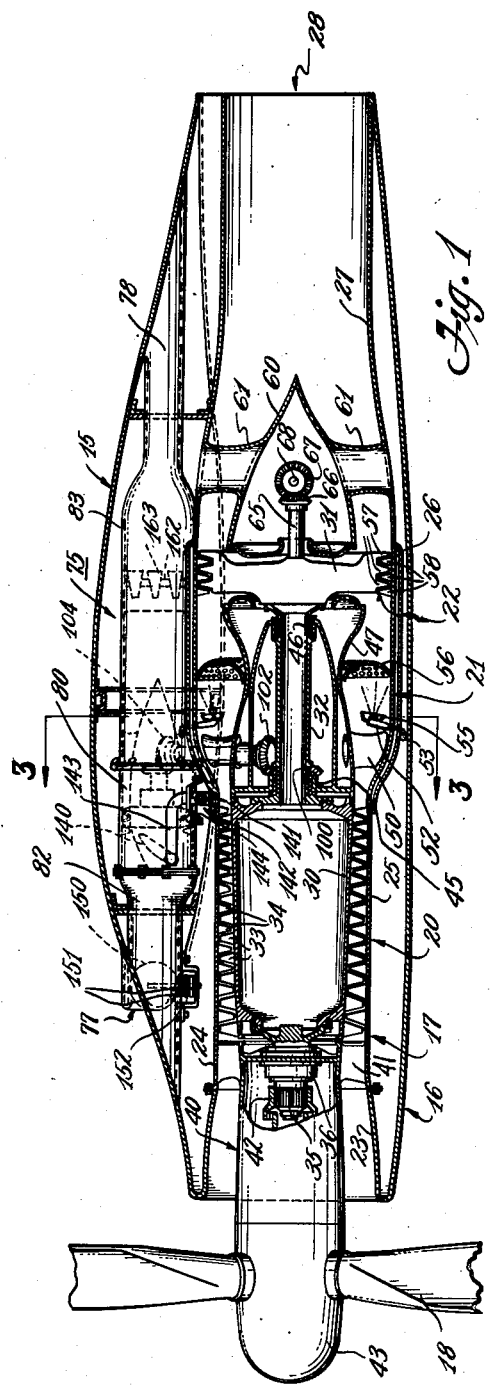
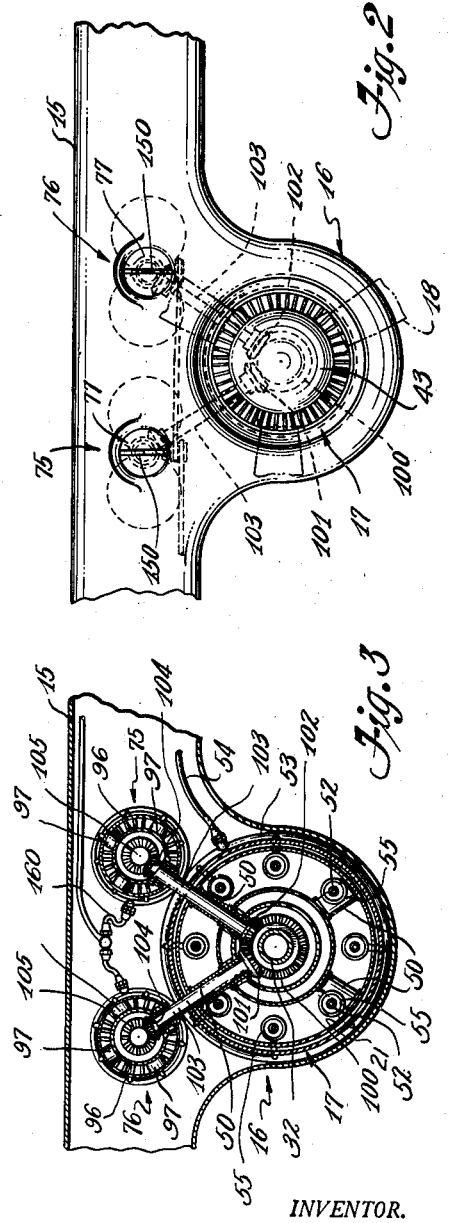
INVENTOR.
JOHN A. DRAKE
by Herbert E. Metcalf
Attorney Dec. 2, 1952  J. A. DRAKE  2,619,795
AIRCRAFT BOOSTER JET POWER UNIT
Filed Jan. 20, 1947  3 Sheets-Sheet 2
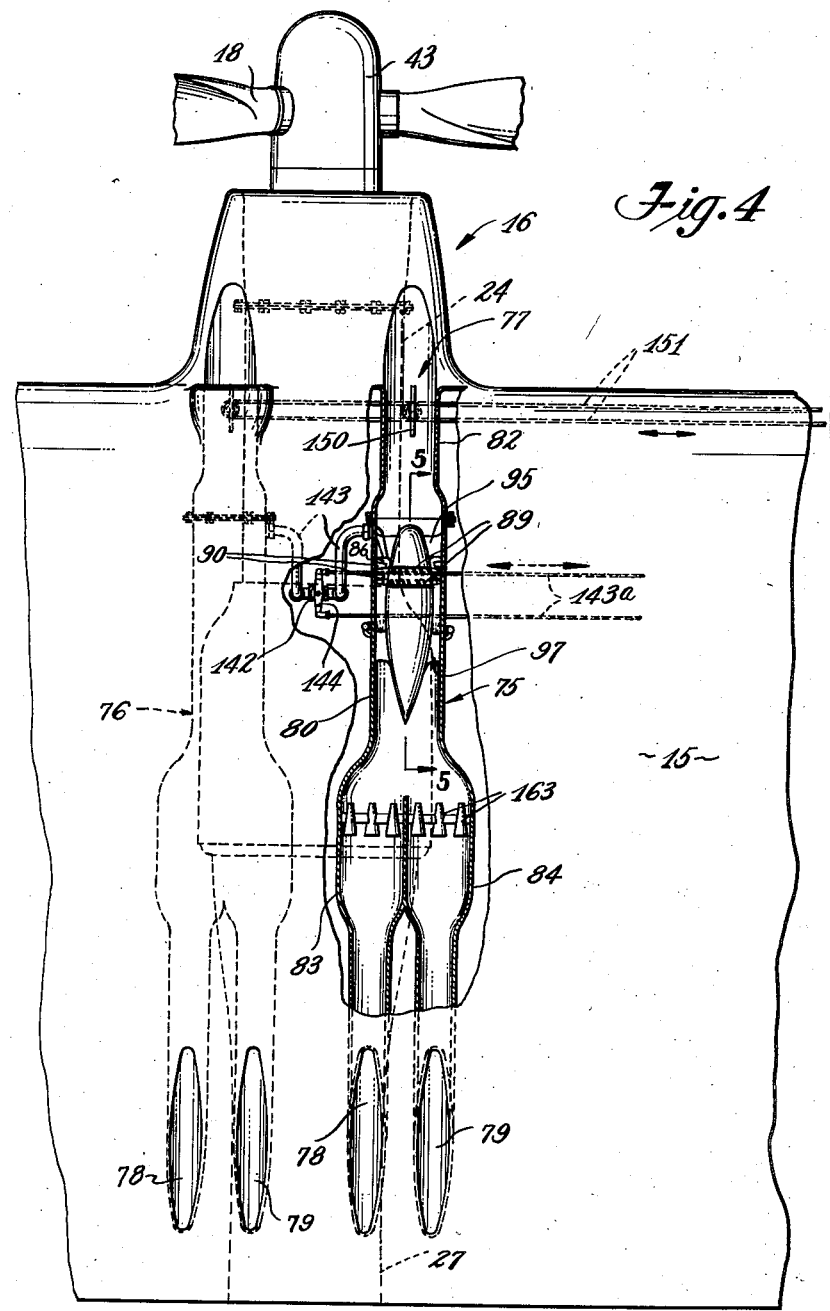
INVENTOR.
JOHN A. DRAKE
by Herbert E. Metcalf
Attorney Dec. 2, 1952  J. A. DRAKE  2,619,795
AIRCRAFT BOOSTER JET POWER UNIT
Filed Jan. 20, 1947  3 Sheets-Sheet 3
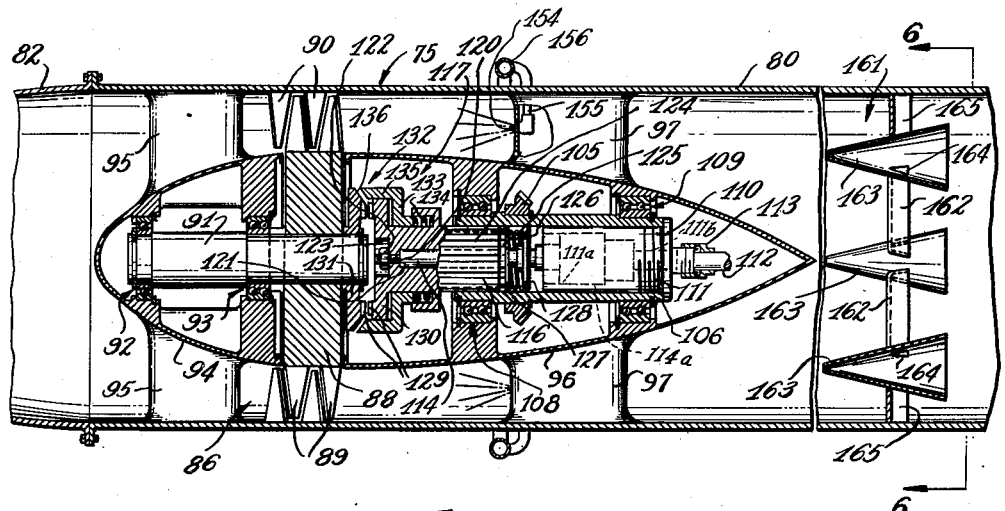
Fig. 5
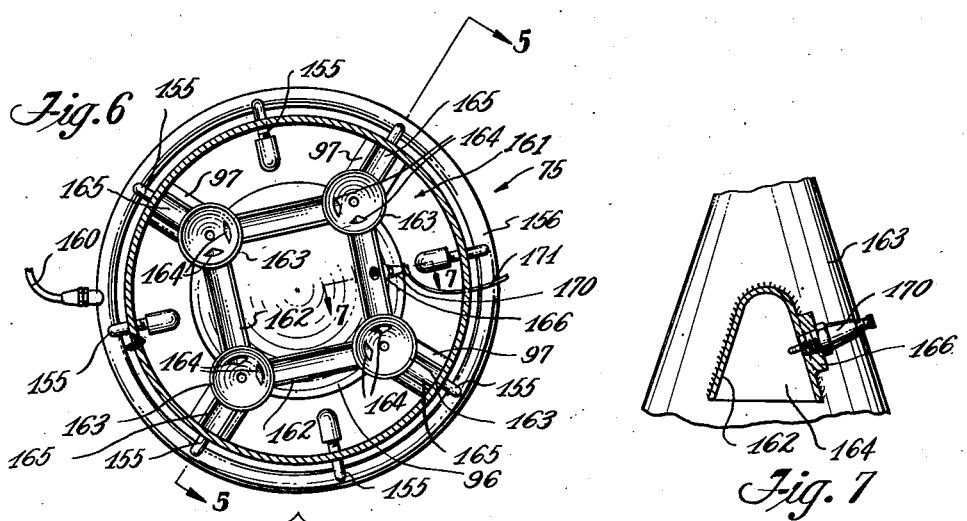
Fig. 6
Fig. 7
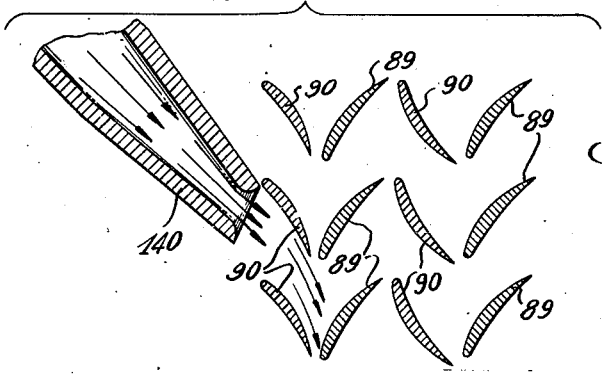
Fig. 8
INVENTOR.
JOHN A. DRAKE
by Herbert E Metcalf
Attorney Patented Dec. 2, 1952

2,619,795

UNITED STATES PATENT OFFICE 2,619,795

AIRCRAFT BOOSTER JET POWER UNIT

John A. Drake, Balboa Island, Calif., assignor, by mesne assignments, to General Electric Company, Schenectady, N. Y., a corporation of New York Application January 20, 1947, Serial No. 723,044

11 Claims. (Cl. 60—35.6)

The present invention relates to aircraft power plants, and more particularly to a novel means and method for improving the performance of combustion gas turbines to give them the necessary operating flexibility for both high speed and long range conditions.

The combustion gas turbine driving a propeller and directing the exhaust rearwardly for jet effect, has several outstanding advantages over conventional reciprocating engines which make it particularly attractive for aircraft use. Among these advantages are its low specific weight, extremely large power outputs, low specific fuel consumption at maximum power, freedom from vibration, use of relatively safe fuels similar to diesel oil or kerosene, compactness, and simplicity of installation.

On the other hand, the gas turbine has at least one serious shortcoming which has thus far defied satisfactory solution and which greatly offsets its many advantages, particularly in the case of military aircraft which must have both long range and high speed. This shortcoming lies in the extremely limited flexibility of the gas turbine, which is difficult to reconcile with the widely different power requirements of the airplane for maximum range and maximum speed. The most economical rate of fuel consumption of the gas turbine often occurs at the maximum power output, hence, desirable practice is to design the aircraft to fly at its cruising speed with the turbine developing substantially full power. However, if full power is utilized for cruising speed, there is no reserve power available to take advantage of the most favorable aerodynamic conditions for maximum speed.

One of the primary objects of the present invention, therefore, is the provision of a novel and highly effective auxiliary power source for increasing the emergency power output of the combined unit up to double or more the maximum power of the gas turbine alone, thereby creating a power plant endowed with all of the advantages of the gas turbine for cruising operation, plus the flexibility required to match the power requirements of the airplane for maximum range and maximum speed. In other words, the output for minimum specific fuel consumption now occurs at approximately 50 per cent of the maximum power available which, as pointed out previously, approaches the ideal condition. At the same time, this auxiliary power unit can be made considerably lighter in weight per pound of thrust for maximum power output than any engine heretofore considered.

The above object is attained by utilizing booster jet engines, each comprising a compressor driven by the cruising power gas turbine and having combustion chambers terminating in one or more jet nozzles. A clutch is provided to bring the boost compressors into and out of operation when desired. By driving the compressors of the booster jet engines with power derived from the cruising power gas turbine, it is possible to eliminate the turbine and a large percentage of the compressor stages which would otherwise be necessary, resulting in a substantial weight reduction for the unit. Elimination of the turbine also permits use of higher combustion chamber temperatures in the booster engines, since the combustion chambers are not followed by highly stressed turbine blades which have heretofore limited combustion gas temperatures. The higher allowable combustion chamber temperature, in turn, gives an additional reduction in power plant weight per pound of thrust. In consequence of the weight savings pointed out above and the higher permissible combustion chamber temperatures, the weight per pound of thrust for the booster jet engines at 30,000 feet altitude and 500 M. P. H. can be made less than one-third of that of the best contemporary turbojet engines.

Another important advantage resulting from the use of separate booster jet engines to obtain the extra power for high speed is the simplification of propeller design problems which results. The reason for this is found in the fact that the power input to a propeller should vary somewhat less rapidly than the cube of the propeller R. P. M. for maximum efficiency. The gas turbine, however, is practically a constant speed machine within the power range under discussion, hence any arrangement for increasing the emergency power available at the turbine shaft would necessitate a compromise between cruising power and maximum power in the selection of the propeller. No such compromise, with its resultant sacrifice in efficiency, is required in the case of the present invention, since the booster jet engines do not feed power into the propeller and the latter can therefore be designed essentially for cruising power only. It has been estimated that the weight saving in the propeller and reduction gear alone, over a straight gas turbine and propeller installation of the same maximum power in the general range of 7500 horsepower, can amount to more than the entire weight of the boost compressors, associated gearing, and combustion chambers.

Another advantage of the present invention lies in the emergency power reserve which is available by merely increasing the combustion chamber temperature of the booster jet units. The choice of the combustion chamber temperature for the boost system is largely determined by the desired operating time. Low temperatures give better specific fuel consumption than are obtained with high temperatures, but high temperatures, on the other hand, give lower specific power plant weights. If the design operating time of the booster is short, a high combustion chamber temperature would be used to take advantage of the low initial weight, since the operating time will not be long enough for the high fuel rate to overcome this advantage. However, if the design operating time is longer, a lower temperature with its lower specific fuel consumption would be more desirable. If the unit is designed to operate for a half hour or longer, with a correspondingly low design combustion chamber temperature, a considerable increase in power may be obtained in an emergency by operating the unit at the higher combustion temperatures which are physically possible. This emergency power can be maintained as long as fuel is available.

These and other objects and advantages of the present invention will become apparent upon consideration of the following detailed description of the preferred embodiment thereof, reference being had to the accompanying drawings, in which:

Figure 1 is a vertical section taken through a power plant embodying the principles of the invention;

Figure 2 is a front elevation of the same;

Figure 3 is a sectional view taken along the line of 3—3 in Figure 1;

Figure 4 is a top plan view, partially cut away, of the power plant installation;

Figure 5 is an enlarged sectional view taken through one of the booster jet units taken along the line 5—5 in Figures 4 and 6;

Figure 6 is a sectional view taken along the line of 6—6 in Figure 5;

Figure 7 is an enlarged sectional view taken along the line 7—7 in Figure 6; and Figure 8 is a developed section, drawn to enlarged scale, of the booster unit compressor blading, showing the arrangement of the starter nozzle which is used to accelerate the rotor up to substantially operating speed.

In the drawings, the power plan is shown more or less diagrammatically and is not to be taken as illustrative of the actual construction which would be used, since the structural details of the power plant form no part of the present invention.

Referring now to the drawings, the reference numeral 15 designates the wing of an airplane, and mounted on the under side thereof is a nacelle 16 housing a primary or cruising power engine 17 which drives a propeller 18. The nacelle 16 is generally annular in shape and is faired into the lower surface of the wing, the front end of the nacelle projecting forwardly from the leading edge of the wing and the rear end of the nacelle terminating flush with the trailing edge of the wing.

In the preferred form illustrated, the engine 17 is a combustion gas turbine comprising an axial flow compressor unit 20, a combustion chamber 21 and a turbine unit 22. The interior wall 23 of the nacelle is faired smoothly into and is attached to the front end of the engine casing 24, forming the intake duct for the combustion air. The engine casing 24 may be the usual composite structure built up of a plurality of sections joined together, and comprises a compressor stator body 25, outer wall of the combustion chamber 21, turbine stator body 26, and tail pipe 27 terminating in a jet nozzle 28.

The compressor rotor 30 and turbine rotor 31 are mounted on a common shaft 32 and are journaled for rotation within their respective stator sections. The compressor unit 20 comprises a plurality of axially spaced circular rows of alternate rotor and stator blades 33 and 34 which are anchored to their respective bodies and extend radially toward the opposite member. The compressor rotor body is preferably hollow and is mounted at its front and rear ends on radial flanges on shafts 35 and 32, respectively. The front shaft 35 is journaled in a bearing 36 supported within a stationary housing 40 which is disposed centrally within the engine casing and mounted on radially extending streamlined struts 41. The housing 40 contains the usual reduction gears which reduce the speed of the turbine shaft to the design speed of the propeller, and the shaft 35 is connected to the said gearing by a splined coupling member 42.

The housing 40 is shaped to provide a smooth continuous fairing from the propeller hub 43 to the compressor rotor body, so as to reduce duct losses to a minimum.

The main shaft 32 of the engine is journaled adjacent its ends in bearings 45 and 46 which are supported within a stationary shell 47, the latter being supported, in turn, within the engine casing 24 on radially extending streamlined struts 50. The shell 47 is shaped to conform to the rear end of the compressor rotor body 30 and to the front end of the turbine rotor body 31, and forms a smooth continuous fairing connecting said bodies, the shell 47 and the engine casing 24 forming between them a toroidal combustion chamber 21.

Extending into the combustion chamber 21 at angularly spaced intervals around its periphery are a plurality of fuel injection nozzles 52, eight in number being shown in Figure 3, which are supplied from a common fuel line 53 encircling the engine casing, and which discharge a finely atomized spray of fuel in the downstream direction. A fuel supply line 54 connects the line 53 with the usual fuel pumps, not shown. Surrounding each of the nozzles 52 on the upstream side thereof is a circular cup-shaped baffle or spoiler 55 which creates a zone of turbulence immediately behind the nozzle. This turbulent zone promotes the intimate mixing of the atomized fuel with the air and at the same time slows down the velocity of the air to prevent the flame from being blown out. Aft of the nozzles 52 is an annular perforated baffle 56 of semi-circular cross section which functions to mix the burning fuel with the excess air to lower the temperature of the combustion gases and produce a more uniform temperature distribution before the gases reach the turbine.

The turbine shown is provided with three stages of blading comprising the usual arrangement of alternate rows of rotor and stator blades 57 and 58 which are anchored to their respective rotor and stator bodies 31 and 26. Behind the turbine wheel and faired into the rotor body 31 thereof is a stationary tail cone 60 which cooperates with the tail pipe 27 to form a duct of gradually increasing width and area wherein the hot gases are compressed substantially adiabatically to increase the pressure and decrease the velocity thereof. The ducts are made in this manner because the turbine design used herein provides for a degree of over-expansion to create a greater pressure drop across the turbine, thus increasing its shaft output, which, in this case is desired to drive a propeller. Therefore, the cross-sectional area of the gas passage in the tail cone is greater than that at the turbine exit, to bring the pressure up to atmospheric, exhibiting the venturi principle. The tail cone 60 is supported centrally within the duct on a plurality of radially extending streamlined hollow struts 61.

Fixed to the turbine rotor body 31 on the axis thereof and projecting rearwardly into the hollow tail cone 60 is a stub shaft 65 having a bevel gear 66 fixed to its rear end. Meshing with the gear 66 is a second bevel gear 67 which is mounted on the inner end of a horizontally disposed shaft 68. The shaft 68 extends through one of the hollow struts 61 and is suitably connected at its outer end to a starting motor (not shown), as well as to the other usual accessory units such as fuel and oil pumps, tachometer, electric generator, and the like.

Located above the gas turbine 17 on either side of the center line thereof and designated by the reference numerals 75 and 76 are two booster jet units which will now be described. The two units 75 and 76 are substantially identical, and it will suffice, therefore, to describe only the right hand unit 75 in detail, it being understood that each part mentioned in the one has its counterpart in the other.

The booster jet unit 75 is mounted within the envelope of the wing 15 and extends in a fore and aft direction, with a forwardly opening air intake scoop 77 in the leading edge of the wing, and rearwardly directed twin jet nozzles 78 and 79 opening through the upper skin of the wing near the trailing edge thereof. The operating mechanism of the unit is contained, for the most part, in a cylindrical housing 80, the front end of which is smoothly faired into and connected with the intake duct 82. At its rear end, the housing 80 is divided to form two combustion chambers 83 and 84 arranged side by side and terminating in the jet nozzles 78 and 79.

The operating mechanism of the booster jet unit consists primarily of an air compressor 86, preferably although not necessarily of the two or three stage axial flow type which is particularly well suited to the handling of a large mass flow of air at relatively low pressures; together with fuel injection and ignition means for raising the temperature of the air. The compressor 86 comprises a rotor body 88 mounting two or more rows of rotor blades 89 which cooperate with corresponding alternate rows of stator blades 90 anchored to the housing 80 to compress the air taken in through the intake duct 82. The rotor body 88 is mounted on a shaft 91 which extends forwardly therefrom and is journaled in bearings 92 and 93, said bearings being supported within a streamlined shell 94 which is supported, in turn, by a plurality of radially disposed, streamlined struts 95. The shell 94 serves as a streamlined nose for the rotor body 88, and to that end is faired smoothly into the latter. A second shell 96 is mounted on radially arranged hollow streamlined struts 97 and forms a streamlined tail cone for the rotor body 88, being smoothly faired into said body.

The compressor 86 is adapted to be driven by power derived from the primary engine 17, and as illustrated, such power is transmitted to the compressor by mechanical transmission means in the form of a drive shaft with associated gearing and clutch means which will now be described. Mounted on the shaft 32 of the primary engine 17 immediately behind the compressor rotor body 30 is a bevel gear 100 which meshes with a pair of angularly spaced bevel gears 101 and 102 fixed to the bottom ends of two radially extending drive shafts 103, one of which drives the compressor of booster unit 75, while the other drives the compressor of unit 76. Each of the drive shafts 103 extends through the center of one of the hollow struts 50 supporting the shell 47, and through one of the hollow struts 97 supporting the tail cone 96.

Fixed to the top end of the shaft 103 inside the tail cone 96 is a bevel gear 104 which meshes with a companionate bevel gear 105 mounted on a tubular shaft 106. The shaft 106 is journalled at its ends in ball bearings 108 and 109 and is internally threaded at the rear end to receive the threads 110 of a hydraulic cylinder 111. A flexible hydraulic line 112 is connected to the cylinder 111 by a hydraulic coupling 113 embodying a running seal, said line 112 passing outwardly through one of the hollow struts 97 to suitable valve means and a source of fluid pressure, not shown.

Projecting forwardly from the hydraulic cylinder 111 is a piston rod 114 which extends through a central bore in a shaft 116, and terminates in a threaded stud 120 of reduced diameter. The shoulder formed at the junction of the stud 120 with the piston rod 114 abuts against a shoulder 121 in the shaft 116 and is drawn against the same by a nut 122 threaded onto the stud and seating on the bottom of a recess 123 in the front end of the shaft 116. The shaft 116 is slidably disposed within the tubular shaft 106 and projects forwardly beyond the front end of the latter. A clutch, designated generally at 117, is carried at the front end of the shaft 116 and provides means for selectively connecting or disconnecting the drive to the booster compressor from the primary gas turbine 17. Splines 124 on the outer surface of the shaft 116 cooperate with internal splines 125 in the front end of the tubular shaft 106 to provide a rotative driving connection from shaft 106 to shaft 116 permitting relative axial sliding movement between them. A compression spring 126 disposed within the tubular shaft 106 and having footing at one end on a ring 127 which is backed up against the end of the splined portion 123, bears against a collar 128 fixed to the piston rod 114, urging the latter toward the right and tending to disengage the clutch 117 when fluid pressure in the hydraulic cylinder 111 is released. Cylinder 111 has a central bore 111a within which is slidably disposed a piston 114a connected to rod 114. Fluid pressure is communicated to piston 114a from hydraulic line 112 through a passageway 111a provided in cylinder 111.

The clutch 117 comprises a driving member 130 fixed to or integral with the end of the shaft 116 and a driven member 131 fixed to the adjacent end of the rotor body 88, said driving and driven members having coacting dog teeth 129 which can be engaged to provide a positive driving connection therebetween. In order to prevent breakage of the dog teeth 129 and undue shock loads to the entire mechanism when the clutch 117 is engaged while the members are running at different speeds, provision is made for bringing the driven member substantially up to the speed of the driving member before engagement of the dog teeth is effected. Such synchronizing means may take any well-known form, and is illustratively shown as comprising a frictional cone clutch 132 having a driving member 133 which is slidably and non-rotatably mounted on the shaft 116 and which is biased to the left by a spring 134. The driving member 133 has an axially extending, annular flange 135 which embraces and extends beyond the clutch driver 130. The end of the flange 135 is formed with a cone face which is engageable with a companionate cone portion 136 formed on the member 131 just outside the outer periphery of the dog teeth 129 thereon. The synchronizing cone clutch 132 is arranged to engage its companionate member 136 before the clutch driver 130 engages its driven member 131, giving a momentary frictional driving connection between the shaft 116 and the rotor body 88 which is sufficient to bring the rotor up to substantially the same speed as the shaft. Further axial movement of the shaft 116 causes the clutch driver 130 to move into engagement with its driven member 131, while the spring 134 yields to allow relative sliding movement of the member 133 back along the shaft 115.

It will be understood, of course, that the clutch 117 and synchronizing means just described are engaged only when the disparity in rotational speed between the drive shaft 116 and rotor 88 is not too great, and said clutch units are never used to start the rotor from a standstill. Initial acceleration of the rotor 88 is accomplished by wind-milling the rotor with the dynamic pressure of air rammed into the intake scoop by the forward velocity of the airplane, the air being turned by the first row of stator guide blades 90 and given a whirl component which acts on the top or back sides of the rotor blades 89 to rotate the rotor.

In addition to the wind-milling effect of the rammed air, the rotor 88 may be further accelerated by a high velocity jet of compressed air taken from immediately behind the last stage of the primary engine compressor 20 and directed by a nozzle 140 through the stator blading 90 against the rotor blades 89, as shown in Figures 1, 4, and 8. To this end, there is a pipe 141 which opens into the top of the chamber 21 directly behind the last stage of the compressor blading. The pipe 141 connects into a valve 142 having two discharge ducts 143 leading to the two booster jet units 75, 76. The valve 142 is a simple open-and-close valve, and may be operated by cables 143a which are attached to opposite ends of a control lever arm 144 on the valve and extend in a spanwise direction through the wing to the operator's station in the airplane. Each of the ducts 143 extends forwardly from the valve 142 and then bends laterally toward its respective booster unit, passing through the housing wall 80 and terminating in the nozzle 140 which is directed through the first row of stator guide blades at a small angle of attack. The high velocity jet from the nozzle 140 is particularly useful in accelerating the rotor 88 beyond the maximum rotational velocity attainable by wind-milling with rammed air alone, although it is also useful in shortening the starting time from a standstill by providing an added starting force.

During normal cruising operation of the airplane on the primary gas turbine and propeller alone, the duct 82 of the booster jet unit is closed by a butterfly valve 150 to reduce the drag which would otherwise result from passage of air through the unit owing to the considerable pressure drop which is obtained therein. The butterfly valve 150 is pivotally mounted in the duct 82 near the entrance thereof, and is controlled by cables 151 which are wrapped around a sheave wheel 152 fixed to the valve stem below the duct wall, said cables likewise extending spanwise through the wing to the operator's station. When it is desired to start the booster jet units 75, 76, the butterfly valves 150 are opened, admitting rammed air to the compressor blading to start the rotor to rotating, and the valve 142 is thereafter opened to direct a jet of air against the rotor blades to impart additional acceleration thereto. As the rotor body 88 of each of the booster jet units approaches a rotative speed synchronized to the speed of the constantly rotating shaft 116 driven from the turbine, the clutch 117 is engaged by actuating a valve admitting fluid pressure to the hydraulic cylinder 111. Pressure selectively admitted through hydraulic line 112 to cylinder 111 causes an enclosed piston 114a to move the piston rod 114 to the left, first engaging the synchronizing clutch 132, and then the positive drive dog clutch 117. At this point, the valve 142 is closed, and fuel is then admitted to the air compressed by the booster compressor.

Finely atomized fuel is sprayed upstream into the air discharged from the compressor 86 through a plurality of angularly spaced fuel nozzles 154 which are arranged substantially midway between the shell 96 and the housing wall 80. In the illustrative example shown there are eight fuel nozzles 154, four of them being disposed out in the open and four of them being contained within the hollow struts 97. The fuel nozzles are connected to fuel supply lines 155 which extend radially outward through suitable openings in the housing wall. At their outer ends, the lines 155 are connected to a circular pipe line 156 which encircles the housing 80 and which is supplied by a fuel line 160 from the fuel pump, not shown.

A short distance to the rear of the shell 96, the housing 80 divides into the two parallel combustion chambers 83 and 84 where combustion is completed, and the heated air and combustion products are then discharged rearwardly through the jet nozzles 78 and 79.

Ignition of the fuel-air mixture takes place downstream of the nozzles 154 in the combustion chambers proper, and originates in the shelter of a barrier structure 161 located at the forward end of each chamber. Each barrier structure 161 comprises a plurality of channel members 162 arranged in the form of a square, with their adjoining ends connected by cones 163 having their open ends facing downstream. Triangular openings 164 are cut through the walls of the cones 163 where they are joined by the channels, giving a continuous, closed circuit of shelter from the high velocity flow of fuel-air mixture. The barrier structure 161 is supported in the combustion chamber on four radially extending channel members 165 which are fixed to the housing wall 80 and to the four cones 163.

One of the channel members 162 has a boss 166 formed thereon, with a tapped hole in its center, and screwed into this tapped hole is an ignition glow plug or spark plug 170, to which electrical current is supplied by a wire 171. The spark or incandescence of the plug 170 causes the fuel-air mixture in the channel 162 to ignite and the flame then travels around the circuit. The presence of the barrier structure 161 creates a zone of turbulence, with localized zones of reduced velocity immediately behind the channel members 162 and cones 163 within which combustion can be maintained regardless of the velocity in the duct. The channel members 162 and cones 163 thus function as torches to reignite the fuel-air charge if the flame is extinguished by excessive velocity of the flow.

The operation and advantageous features of the power plant described above are belived to be clear from the foregoing discussion and need not be repeated here. It might be mentioned in passing, however, that one of the most attractive features of the unit is its flexibility, resulting from the fact that the ratio of primary to boost air mass flow can be varied within wide limits, giving any desired spread between cruising and maximum power output. For high speed operation, this system provides large powers at a specific weight considerably lower than that of a reciprocating engine or a gas turbine and approximately equal to the specific weight of a straight jet unit, while for crusing operation the best features of the gas turbine are utilized to the fullest extent.

While I have shown and described in considerable detail one illustrative embodiment of my invention, it is to be understood that the invention is not limited to such details, but that widely differing means may be employed without departing from the broad scope of the invention as defined in the appended claims.

I claim:

1. An aircraft power plant comprising the combination of a main combustion gas turbine including an air compressor portion, a combustion chamber portion and a turbine portion connected to said compressor portion by a shaft and adapted to drive a propeller, said compressor portion having a compressor inlet between said compressor portion and said propeller, a power boost unit positioned at one side of and adjacent said combustion gas turbine and having an axis parallel to the axis of said shaft, said unit including an auxiliary air inlet in the path of air discharged from said propeller, an auxiliary compressor receiving air from said auxiliary inlet, an auxiliary combustion chamber receiving air from said auxiliary compressor, and a jet pipe for discharging heated air from said combustion chamber in the same direction as the air from said propeller, and means including disengageable clutch means for selectively connecting said auxiliary compressor to the shaft of said combustion gas turbine for rotation thereby.

2. Apparatus in accordance with claim 1 wherein means are provided for closing said auxiliary air inlet when said auxiliary compressor is not connected to the shaft of said combustion gas turbine.

3. Apparatus in accordance with claim 1 wherein means including nozzle means are provided for directing a portion of the air from the compressor portion of said main combustion gas turbine against blades of said auxiliary compressor to rotate the latter before mechanical connection of the auxiliary compressor to said shaft is effected.

4. An aircraft power plant comprising the combination of a main combustion gas turbine including an air compressor portion, a combustion chamber portion and a turbine portion connected to said compressor portion and adapted to drive a propeller, said compressor portion having a compressor inlet between said compressor portion and said propeller, a power boost unit positioned at one side of and adjacent said combustion gas turbine and having an axis parallel to the axis of said shaft, said unit including an auxiliary air inlet in the path of air discharged from said propeller, an auxiliary compressor receiving air from said auxiliary inlet, an auxiliary combustion chamber receiving air from said auxiliary compressor, and a jet pipe for discharging heated air from said auxiliary combustion chamber in the same direction as the air discharged from said propeller, power transmission means between said main combustion gas turbine and said auxiliary compressor, said power transmission means including a clutch member connected to said shaft and a second clutch member connected to said auxiliary compressor, said clutch members when connected completing a driving connection between said combustion gas turbine and said auxiliary compressor through said power transmission means, means including nozzle means for directing a portion of air from the compressor portion of said main combustion gas turbine against blades of said auxiliary compressor to accelerate said latter compressor to a speed where said clutch members are substantially in synchronism before connecting said clutch members, and means for connecting said clutch members.

5. An aircraft power plant comprising the combination of a main combustion gas turbine including an air compressor portion, a combustion chamber portion and a turbine portion connected to said compressor portion and adapted to drive a tractor propeller, said compressor portion having a compressor inlet between said compressor portion and said propeller, a power boost unit positioned at one side of and adjacent said combustion gas turbine and having an axis parallel to the axis of said shaft, said unit including an auxiliary air inlet in the path of air discharged from said propeller, an auxiliary compressor receiving air from said auxiliary inlet, an auxiliary combustion chamber receiving air from said auxiliary compressor, and a jet pipe for discharging heated air from said auxiliary combustion chamber in the same direction as the air discharged from said propeller, power transmission means between said main combustion gas turbine and said auxiliary compressor, said power transmission means including a clutch member connected to said shaft and a second clutch member connected to said auxiliary compressor, said clutch members when connected completing a driving connection between said combustion gas turbine and said auxiliary compressor through said power transmission means, means including a nozzle for directing a portion of air from the compressor portion of said main combustion gas turbine against blades of said auxiliary compressor to drive said latter compressor until it has been accelerated approximately to operating speed, means for synchronizing said auxiliary compressor with said power transmission means before connecting said clutch members, and means for connecting said clutch members.

6. An aircraft power plant comprising a combustion gas turbine adapted to drive a propeller and having the characteristics of low specific fuel consumption at high power output and substantially constant-speed operation at various power outputs, an auxiliary thrust augmenter comprising an air compressor connected to be driven by said gas turbine, a diffuser connected with said compressor to receive air compressed thereby, and means for injecting fuel into said diffuser, the rear end of said diffuser being divided downstream from said fuel injecting means to form a pair of spaced parallel continuous-burning combustion chambers providing a substantially enlarged total cross-sectional area, each of said combustion chambers terminating in a rearwardly directed jet nozzle through which the combustion products and excess air are discharged to produce a reaction thrust on said aircraft, said thrust augmenter having an air intake, said air compressor, said diffuser, and said combustion chambers all located one behind another about a common center-line.

7. An aircraft power plant comprising the combination of a combustion gas turbine having a compressor portion, a power boost unit comprising an auxiliary compressor adapted to be connected with said combustion gas turbine to be driven thereby, and means including a nozzle for directing air compressed by said compressor portion into said auxiliary compressor to accelerate said auxiliary compressor substantially up to operating speed before connecting it to said combustion gas turbine.

8. An airplane power plant comprising a combustion gas turbine adapted to drive a propeller and having the characteristics of low fuel consumption at high power output and substantially constant speed operation at various power outputs, said combustion gas turbine having a compressor portion, an auxiliary thrust augmenter comprising an auxiliary compressor, mechanical power transmission means operatively connecting said compressor to said combustion gas turbine, said transmission including a clutch whereby said auxiliary compressor can be disconnected from said combustion gas turbine, means utilizing air compressed by said auxiliary compressor portion for directing a jet rearwardly to produce a reaction thrust in an aircraft, and means for applying air compressed by said compressor portion to said auxiliary compressor to rotate same as a turbine with an acceleration substantially up to operating speed before connecting said auxiliary compressor to said combustion gas turbine by operation of said clutch.

9. An aircraft power plant comprising the combination of a combustion gas turbine, including an air compressor, a combustion chamber, and a turbine adapted to drive a propeller, and having the characteristics of low specific fuel consumption at high power output and substantially constant-speed operation at various power outputs, a power boost unit including a separate air compressor and combustion chamber, power transmission means including a clutch operatively connecting said boost unit compressor to said turbine, rearwardly directed jet nozzles connected to said boost unit combustion chamber whereby the combustion products and excess air are discharged so as to produce a reaction thrust on the aircraft, and means for bleeding a portion of the air from said turbine compressor and directing the same against the blading of the boost unit compressor to drive the latter as a turbine until it has been accelerated up to a speed substantially in synchronism with said power transmission means before engaging said clutch.

10. An aircraft power plant comprising the combination of a combustion gas turbine including an air compressor, a combustion chamber, and a turbine adapted to drive a propeller, and having the characteristics of low specific fuel consumption at high power output and substantially constant-speed operation at various power outputs, a power boost unit including a separate air compressor and combustion chamber, power transmission means including a clutch operatively connecting said boost unit compressor to said turbine, rearwardly directed jet nozzles connected to said boost unit combustion chamber whereby the combustion products and excess air are discharged so as to produce a reaction thrust on the aircraft, means for diverting a portion of the air from said turbine between the compressor and combustion chamber thereof, and directing the same against the blading of the boost unit compressor to drive the latter as a turbine until it has been accelerated up to approximately operating speed, and means for synchronizing said boost unit compressor with said power transmission means before engagement of said clutch.

11. An aircraft power plant comprising the combination of a combustion gas turbine including an air compressor, a combustion chamber, and a turbine adapted to drive a propeller, and having the characteristics of low specific fuel consumption at high power output and substantially constant-speed operation at various power outputs, a power boost unit including a separate air compressor and combustion chamber, power transmission means including a clutch operatively connecting said boost unit compressor to said turbine, rearwardly directed jet nozzles connected to said boost unit combustion chamber whereby the combustion products and excess air are discharged so as to produce a reaction thrust on the aircraft, and means for diverting a portion of the air from said turbine compressor and directing the compressed air through a jet nozzle against a limited portion of the boost unit compressor blading area to accelerate said boost compressor up to substantially operating speed before engaging said clutch.

JOHN A. DRAKE.

REFERENCES CITED

The following references are of record in the file of this patent:

UNITED STATES PATENTS

| Number | Name | Date |
|---|---|---|
| 1,369,672 | Koenig | Feb. 22, 1921 |
| 2,197,179 | Hersey | Apr. 16, 1940 |
| 2,280,835 | Lysholm | Apr. 28, 1942 |
| 2,409,177 | Allen et al. | Oct. 15, 1946 |
| 2,426,008 | Forsyth | Aug. 19, 1947 |
| 2,447,100 | Stalker | Aug. 17, 1948 |
| 2,458,600 | Imbert | Jan. 11, 1949 |
| 2,470,348 | Haight | May 17, 1949 |
| 2,509,890 | Stalker | May 30, 1950 |